(12) United States Patent
DuCharme, Jr. et al.

(10) Patent No.: US 6,319,457 B1
(45) Date of Patent: Nov. 20, 2001

(54) METHOD FOR EXTRUDING TUBULAR FILM

(75) Inventors: Paul Edmund DuCharme, Jr., Tinley Park; Owen Joseph McGarel, Naperville, both of IL (US)

(73) Assignee: Viskase Corporation, Willowbrook, IL (US)

( * ) Notice: Subject to any disclaimer, the term of this patent is extended or adjusted under 35 U.S.C. 154(b) by 0 days.

(21) Appl. No.: 09/384,106

(22) Filed: Aug. 27, 1999

(51) Int. Cl.⁷ .................... B65H 20/00; B29C 47/92; B29C 47/20
(52) U.S. Cl. .................... 264/559; 226/90; 226/91; 226/180; 264/178 R; 264/187; 264/209.1; 264/563; 425/66; 425/71
(58) Field of Search .................. 226/90, 91, 180; 264/558, 559, 560, 561, 562, 563, 564, 209.2, 570, 178 R, 187, 198, 209.1; 425/66, 71

(56) References Cited

U.S. PATENT DOCUMENTS

| | | |
|---|---|---|
| 4,195,054 * | 3/1980 | Verellen et al. . |
| 5,085,566 * | 2/1992 | Bosse et al. . |
| 5,597,587 * | 1/1997 | Nicholson et al. . |
| 5,658,524 | 8/1997 | Portnoy . |
| 5,658,525 * | 8/1997 | Kajiwara et al. . |
| 5,759,478 | 6/1998 | Kajiwara . |
| 5,766,540 * | 6/1998 | Kajiwara et al. . |
| 5,921,453 * | 7/1999 | Suzuki . |

* cited by examiner

Primary Examiner—Jan H. Silbaugh
Assistant Examiner—Mark Eashoo
(74) Attorney, Agent, or Firm—Roger Aceto; Donna Bobrowicz

(57) ABSTRACT

A method and apparatus is disclosed for lacing an extruded tube of a non derivatized cellulose through an S-wrap to collapse the tube to a flat width. The lacing to form the S-wrap is accomplished without slowing the extrusion speed. At the start of the extrusion operation, the extrusion path leads between a pair of horizontally lacing members. After the leading edge of the extruded tube has passed downwardly through the space between the lacing members, the members are rotated as a unit to bring them into contact with opposite sides of the extruded tube. This collapses the and creates the S-wrap.

4 Claims, 2 Drawing Sheets

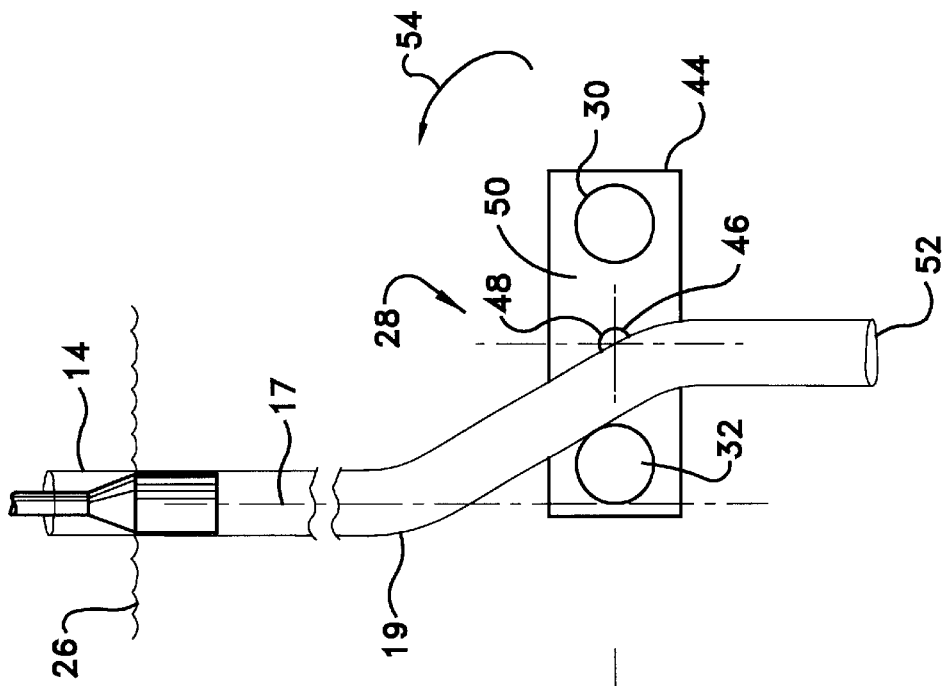
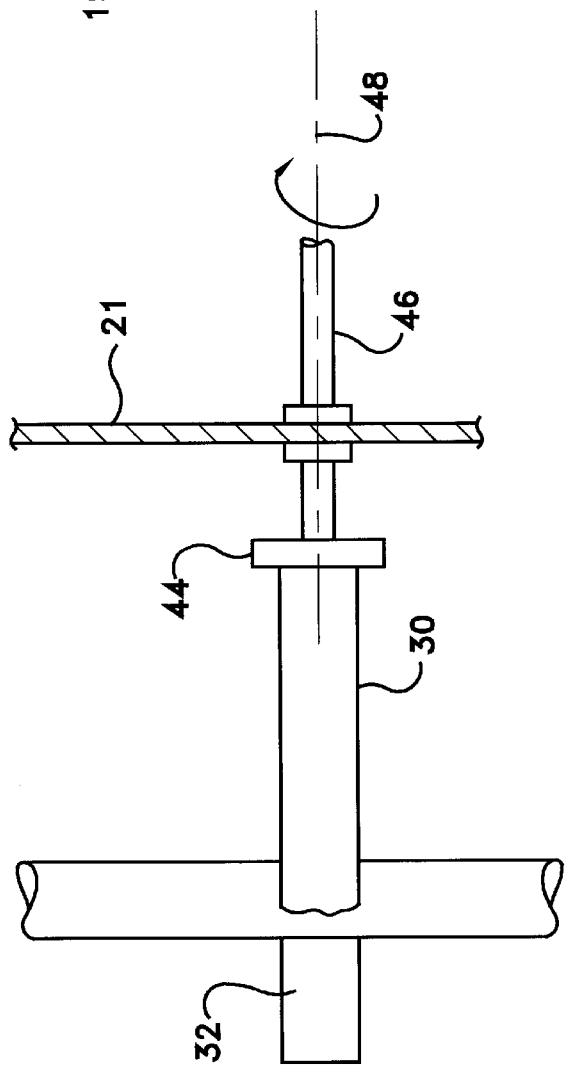
FIG. 2
FIG. 3

METHOD FOR EXTRUDING TUBULAR FILM

TECHNICAL FIELD

The present invention relates to the extrusion of a tubular film and more particularly to the extrusion of a tubular film composed of non derivatized cellulose wherein the film, while in a gel state, must be flattened by lacing around cylindrical lacing members without interruption of the high speed extrusion process.

BACKGROUND OF THE INVENTION

A solvent system for making cellulosic food casings is known in the art. Briefly, a natural cellulose such as a wood pulp or cotton linters is mixed with an aqueous tertiary amine oxide cellulose solvent such as N-methyl-morpholine-N-oxide (NMMO) to prepare a premix. The premix is heated with stirring to evaporate a portion of the water and dissolve the cellulose. The result is a thermoplastic cellulose solution, called "dope", which can be extruded or molded to a desired shape. The extruded or formed article composed of the dope then is contacted with a cellulose non solvent such as water or a non solvent mixture of water and NMMO. The contact with the non solvent extracts the solvent from the dope causing the precipitation or regeneration of the cellulose from the solution.

The solvent system, as set out above, is distinguished in that the natural cellulose is dissolved directly as opposed to chemically treating the cellulose to form a soluble cellulose derivative as in the well known viscose process. Accordingly, for purposes of the present invention, the term "non derivatized cellulose" means a cellulose which has not been subject to covalent bonding with a solvent or reagent but which has been dissolved by association with a solvent or reagent through Van der Waals forces or hydrogen bonding.

The dissolution process as described above is more particularly set out in U.S. Pat. Nos. 2,179,181; 3,447,939; 4,145,532; 4,426,228 and 5,094,690. Methods and apparatus for forming a food casing from the thermoplastic cellulose solution are more particularly described in U.S. Pat. Nos. 5,277,857; 5,451,364; 5,759,478 and 5,766,540.

In brief, forming a tubular food casing is accomplished by extruding the dope as a thin walled tube about a mandrel and into a bath of non solvent liquid or "outer bath" which contacts the outer surface of the extruded tube. As noted above, the extraction of solvent and regeneration of the cellulose in the bath forms a hydrated, or "gel", tube of cellulose. After regeneration, the gel tube is washed to remove traces of the solvent. Then it is dipped into a glycerine solution and dried under inflation to about 7 to 10 percent moisture based on the weight of cellulose to form a tubular cellulose film for use as a sausage casing. After drying, the inflated tube (hereafter referred to as casing) is collapsed to its flat width and reeled with up to 11,000 feet (3353 meters) or more of casing on each reel. The casing on the reel is referred to as "semi-finished casing". The semi-finished casing then is subjected to further treatment in order to prepare it for use by the sausage maker.

During the course of the downward extrusion, a non solvent liquid is introduced into the interior of the extruded tube. This introduced liquid forms an internal bath for initiating the extraction of the solvent at the inner surface of the extruded tube. The introduced liquid also cools the interior surface of the extruded tube and provides lubrication between the extruded tube and the mandrel. At some point during its decent into the outer bath, the extruded tube must be collapsed to a flat width so it forms a web for further transport through the process. Collapsing the tube to a flat width holds back the inner bath and prevents most of the inner bath from being carried forward through subsequent steps in the process.

A conventional flattening ladder used, for example, to flatten a blown film, is not effective to flatten the extruded tube because it is not able to hold back the liquid of the inner bath. A pair of nip rolls to collapse the extruded tube also can not be used. This is because the extruded tube at this point in the manufacturing process is still relatively fragile and the pressure applied to create the nip unacceptably damages the extruded tube by creasing or folding it. Simply passing the extruded tube around a turn roll or draw roll that directs the extruded tube upward and out of the outer bath will collapse the tube but is unacceptable because the tube tends to slip with respect to the roll and this alters aspects of the casing geometry.

Another aspect to consider is that the means to collapse the tube to a flat width should not interfere with the speed of the extrusion at start-up. In this regard, the extrusion speed may be 60 meters per minute or more. Thus, the means used to flatten the tubular extrusion must be applied in a manner which does not slow the extrusion rate.

Means found to be effective both to collapse the tube to a flat width and hold back the liquid of the internal bath comprise a plurality of rods around which the tube is laced. Lacing the tube around the rods directs the tube through a sinuous path or "S-wrap" which collapses the tube to a flat width. Moreover, it was found that if the rods are of sufficient diameter, the flattening can be accomplished without creasing the tube. However, while the S-wrap is effective to flatten the tubing and to hold back the internal bath liquid without creasing the casing, lacing the extruded tube around the rods to create the S-wrap is difficult to accomplish at extrusion speeds. Such lacing is particularly difficult because it must be done at some depth below the level of the outer bath.

Accordingly, one object of the present invention is to provide a method and apparatus for collapsing an extruded tube of non derivatized cellulose to a flat width without applying a nip to the tube.

Another object of the present invention is to provide a method and apparatus for collapsing an extruded tube of non derivatized cellulose to a flat width for holding back an internal bath liquid with out creasing the extruded tube.

A further object of the present invention is to provide a method and apparatus for collapsing an extruded tube of non derivatized cellulose to a flat with by lacing a leading edge of the tube around a lacing means to create an S-wrap.

Still another object of the present invention is to provide a method and apparatus for flattening an extruded tube of a non derivatized cellulose to a flat width by creating an S-wrap lacing of the tube during the extrusion of the tube without decreasing the speed of the extrusion or distorting the fragile extruded tube.

SUMMARY OF THE INVENTION

In the present invention, collapsing an extruded tube of non derivatized cellulose to a flat width without creasing the tube is accomplished by lacing the tube around a pair of parallel cylindrical rods to create an S-wrap. The pressure applied by passing the tube around the S-wrap provides for the hold back of the liquid within the tube so that only a minor portion of the liquid passes through the S-wrap. The rods creating the S-wrap are mounted on a rotatable plate. On start up of the extrusion, the plate is positioned so the rods are spaced horizontally. This spacing allows the extruded tube to pass downwardly in a vertical path through the space between the rods. After the leading edge of the extruded tube has passed between the spaced rods, the plate is rotated about 180° so the positions of the two rods are reversed. Rotation of the plate brings the rods to bear against opposite sides of the tube thereby flattening the tube.

Accordingly, the present invention may be characterized in one aspect thereof by a method for collapsing an extruded tubular film of non derivatized cellulose to a flat width during the course of the continuous extrusion of the tube comprising the steps of:

a) downwardly extruding a tube composed of a non derivatized cellulose solution along a vertical extrusion axis and into a bath of non solvent liquid;

b) arranging a pair of cylindrical lacing members side-by-side in a generally horizontal orientation below the surface of the bath of non solvent liquid, the members being at least 25.4 mm in diameter and a first of the members being arranged with its cylindrical surface generally tangent to the vertical extrusion axis, the members defining a space therebetween for accommodating the passage of an extruded tube passing vertically through the space and the lacing members being rotatable as a unit about a common horizontal axis that is laterally spaced from the vertical extrusion axis, c) passing a leading end of the tube through the space between the lacing members; and thereafter d) rotating the lacing members 180° about the common axis that is literally spaced from the vertical extrusion axis thereby reversing the relative positions of the lacing members; and e) in the course of said rotating, contacting the lacing members against opposite sides of the tube thereby deflecting the contacted portion of the tube from the vertical extrusion axis and directing the contacted portion of the tube through a sinuous path of travel while collapsing the tube to a flat width.

In another aspect, the present invention may be characterized by an apparatus for collapsing an extruded tube of a non derivatized cellulose to a flat width during the extrusion thereof comprising:

a) extrusion means for downwardly extruding a tube composed of a non derivatized cellulose solution along a generally vertical path of travel into a bath of a non solvent liquid;

b) a pair of spaced lacing members disposed in the bath, the lacing members being horizontally oriented and defining a space therebetween for the passage of a tube being extruded from the extrusion means;

c) means operable for rotating the lacing members as a unit from the first position to a second position after a leading end of a tube being extruded has passed vertically between the horizontally oriented lacing means whereby the rotation contacts the lacing members against the opposite sides of the tube to deflect the tube from its generally vertical path of travel to a sinuous path passing under one of the lacing members and over another while collapsing it to a flat width.

DESCRIPTION OF THE DRAWINGS

FIG. 2 is a front elevation view on a larger scale of a portion of the non solvent bath showing the position of the S-wrap components during the start-up of extrusion; and FIG. 3 is a side elevation view, partly broken away and in section of the S-wrap components as seen in FIG. 2.

DETAILED DESCRIPTION OF THE INVENTION

Figure 1:
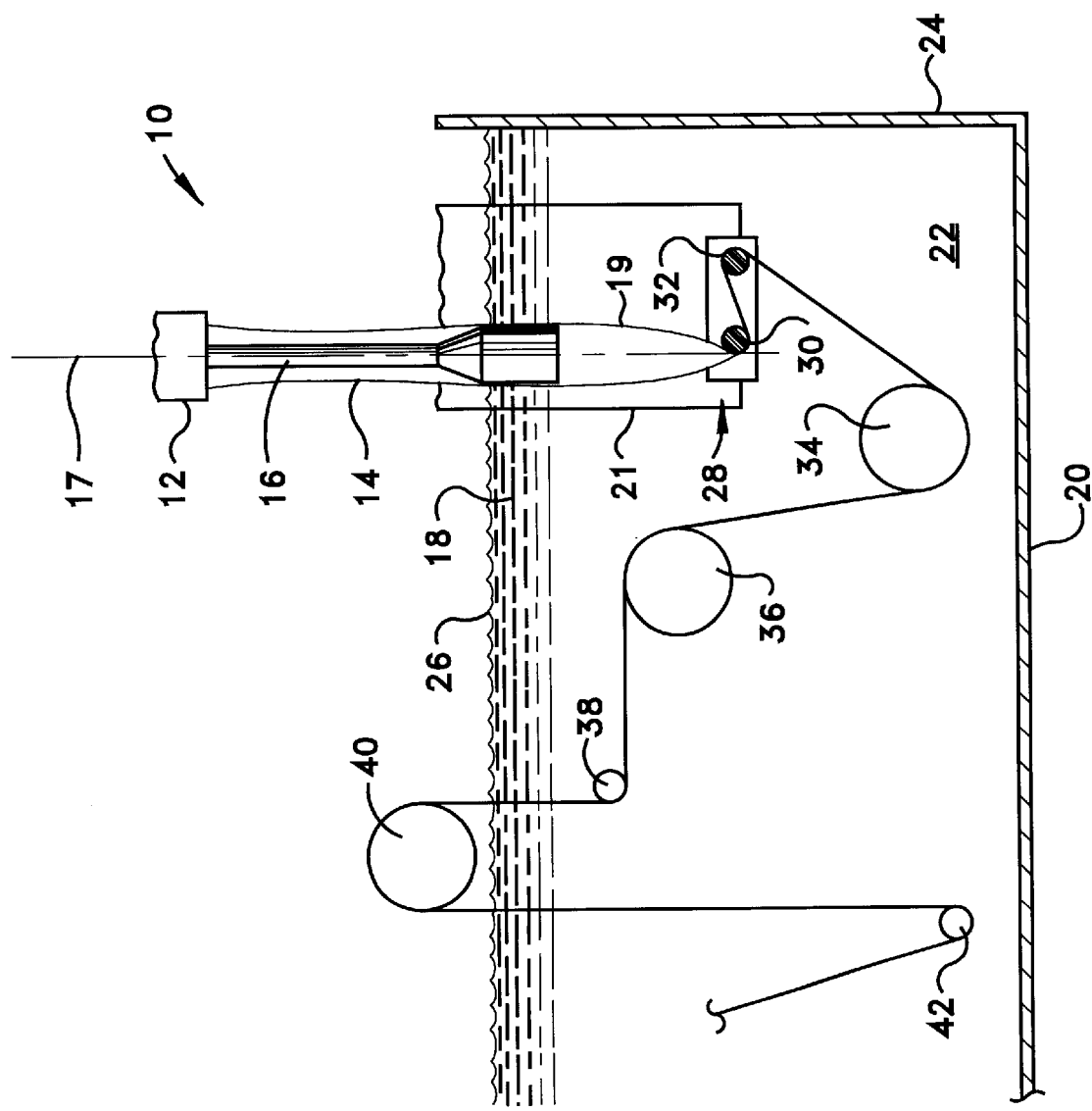
FIG. 1 is front elevation view of the extrusion apparatus and a portion of the non solvent bath showing the position of the S-wrap components during continuous extrusion.

Referring to the drawings, FIG. 1 shows a portion of apparatus, generally indicated at 10, for use in the manufacture of a non derivatized cellulose food casing. The apparatus includes a die 12 arranged for downwardly extruding a tube 14 of a non derivatized cellulose solution. The extrusion is about a mandrel 16 which depends from the die. The mandrel forms no part of the present invention and reference is made to U.S. Pat. Nos. 5,766,540; 5,759,478; and 5,277,857 for more details on the mandrel structure and the method for extruding a non derivatized cellulose casing. It is sufficient to say for purposes of the present invention that the mandrel structure holds the extruded tube open and diametrically stretches the extruded tube.

Extrusion is downwardly through a vertical path of travel along an extrusion axis 17 which is coincides with the axis of the mandrel and into a regenerating bath of a non solvent liquid 18. The bath is contained in a tank defined by a bottom 20 and side and end walls 22 and 24 respectively (only one of each being shown). The level of the non solvent liquid is shown at 26.

Since the extruded tube is held open by the mandrel 16, the portion of the tube indicated at 19 below the mandrel fills with the liquid of the regenerating bath. This portion 19, sometimes called "the bag" remains filled and is replenished with regenerating liquid during operation. This is accomplished by continuously adding and removing regenerating liquid through a pair of mandrel conduits (not shown).

In the bath, the extrusion passes first around an S-wrap unit 28 defined by a pair of lacing members comprising cylindrical rods 30, 32 and then around a pair of driven draw rolls 34, 36 which stretch it in the machine direction. The extrusion then passes over a stationary glass rod 38 which directs it upwardly and out of the bath. It then passes over a third driven draw roll 40 and back into the bath and then around another glass rod 42. The extrusion may be festooned over a series of driven rolls 40 and glass rods 42 in order to increase the residence time of the tube in the bath liquid 18 to insure the extraction of sufficient solvent to form a tube of a hydrated non derivatized cellulose gel.

The S-wrap unit 28 performs several functions. It collapses the extruded tube and flattens it so it can be laced through the subsequent system of draw rolls and glass rods. Flattening the extruded tube also serves to hold back the liquid in bag 19 while allowing a minimum quantity of the liquid to bleed through the S-wrap. The liquid which bleeds through prevents the internal surfaces of the collapsed tube from adhering together. It also is important to accomplish the flattening of the extruded tube without forming wrinkles in the flattened tube such that the tube is collapsed to as near a flat width as possible. Also, the tube which passes around the S-wrap is relatively fragile because it is in a gel state and still contains a high percentage of solvent. In this gel state the tube is susceptible to creasing along the edges of the flattened tube during passage through the S-wrap. Creases along the edges of the flattened tube are to be avoided because the crease will be a casing weak point and the casing is likely to fail along the crease during a stuffing operation.

It has been found that the configuration and location of the S-wrap components are important to accomplishing the purpose of the S-wrap without damage to the casing. In particular, it has been found that folds are avoided by locating the rod 30 which is first contacted by the extruded tube, so its outer surface is tangent to the centerline 17 of the extruded tube. This allows the diametrically opposite sides of the extruded tube to collapse towards the flat width equally so that one side is not drawn or stretched farther in the machine direction than the diametrically opposite side.

The amount of surface contact between the extruded tube and rod 30 also is important. In this respect it is preferred that the two rods 30, 32 forming the S-wrap be generally in the same horizontal plane as shown. Rotating rod 32 downward from the plane decreases the surface area of contact between the extruded tube and rod 30 which tends to allow excessive carry over of the liquid from bag 19. Conversely, rotating rod 32 upward from the plane increases the surface area of contact so that friction may cause the tube to chatter as it passes around the rod. Accordingly, the preferred horizontal arrangement provides the minimum surface area of contact in the S-wrap needed to hold back liquid in the bag 19. To further decrease friction, the rods preferably are made of a relatively friction-free material such as tetrafluoroethylene or glass.

A third important factor is the diameter of the rods relative to the diameter of the extruded tube. In this respect, it has been found that a rod diameter considerably smaller than the diameter of the extruded tube will increase the likelihood of creasing the extruded tube as it passes through the S-wrap. For this reason it is preferred that the rods 30, 32 have a diameter that is close to the diameter of the extruded tube and that they be at least 25.4 mm in diameter. With a rod diameter of this size there is less of a crimping or creasing force put on the extruded tubing as it travels around the S-wrap.

In operation, the cellulose solution can be extruded at the rate of 38 to 60 meters per minute or more. On start up and with the extrusion at these speeds, it should be appreciated that there is little time to direct the leading edge of the extrusion through the tight confines of the S-wrap. The present invention permits the lace-up through the S-wrap at the start-up of extrusion at the full extrusion speed.

Reference is made to FIGS. 2 and 3 which show the orientation of the S-wrap unit at the start of the extrusion operation. FIGS. 2 and 3 show that the S-wrap unit 28 includes a vertically oriented mounting plate 44. The plate has an axle 46 that is jumbled to a fixed bracket 21 extending into the bath so the plate can be rotated about a generally horizontal axis 48 by means (not shown). The bars 30, 32 extend horizontally from the mounting plate, one on either side of the mounting plate rotational axis 48.

FIGS. 2 and 3 show the S-wrap unit at the start of the extrusion operation. At start-up, the position of the S-wrap unit is rotated about 180° degrees from the position shown in FIG. 1. As best seen in FIG. 2, the horizontal rotational axis 48 of the S-wrap unit is located to one side of the mandrel axis 17. In particular, the surface of rod 32 is substantially tangent to mandrel axis 17 so that the rod is in the path of travel of the tube being extruded from the die 12. In this start-up position, the rods 30, 32 provide an open space 50 which is wide enough so that the leading edge 52 of the tube is led easily between the rods. After the leading edge 52 of the extruded tube has been led through the space 50 and around the draw rolls 34, 36 and 40 (FIG. 1), the S-wrap unit 28 is rotated about 180° in the direction shown by arrow 54.

In the course of the rotation in the direction of arrow 54, bars 30, 32 contact opposite sides of the extruded tube and exchange positions. This deflects the extruded tube from its vertical path to form the S-wrap as shown in FIG. 1 wherein the extruded tube passes under rod 30 and over rod 32.

In this manner the start-up of the extrusion is facilitated in that forming the S-wrap of the extruded tube is accomplished quickly and with a minimum of effort. Having the rotational axis 48 of the S-wrap unit 28 located to one side of the extrusion axis 17 as shown positions the bar 30 in the path of travel of the extruded tube so the outer surface of the rod is substantially tangent to the extrusion axis when S-wrap is formed. This arrangement is believed to be optimal as it allows the bag portion 19 to remain vertical as the extruded tubing below the bag is collapsed by drawing through the S-wrap.

Having described the invention in detail, what is claimed as new is:

1. A method for collapsing an extruded tubular film of non derivatized cellulose to a flat width during the course of the continuous extrusion of the tube comprising the steps of:

a) downwardly extruding a tube composed of a non derivatized cellulose solution along a vertical extrusion axis and into a bath of non solvent liquid;

b) arranging a pair of cylindrical lacing members side-by-side in a generally horizontal orientation below the surface of the bath of non solvent liquid, the members being at least 25.4 mm in diameter and a first of the members being arranged with its surface generally tangent to the vertical extrusion axis, the members defining a space therebetween for accommodating the passage of an extruded tube passing vertically through the space and the lacing members being rotatable as a unit about a common horizontal axis that is laterally spaced from the vertical extrusion axis;

c) passing a leading end of the tube through the space between the lacing members; and thereafter d) rotating the lacing members 180° about the common horizontal axis that is laterally spaced from the vertical extrusion axis thereby reversing the relative positions of the members; and e) in the course of said rotating, contacting the lacing members against opposite sides of the tube thereby deflecting the contacted portion of the tube from the vertical extrusion axis and directing the contacted portion of the tube through a sinuous path of travel to form an S-wrap while collapsing the tube to a flat width.

2. A method as in claim 1 comprising rotating the members in a direction so as to form an S-wrap by passing the extruded casing first under one of the lacing members and then over the other.

3. A method as in claim 1 comprising passing the leading edge of the extruded tube around at least one draw roll prior to rotating the lacing members.

4. A method as in claim 1 wherein said extruding is at a speed of at least 38 meters per minute and rotating the lacing members to form the S-wrap without abating the extruding speed.

* * * * *